US009035745B2

(12) United States Patent
Vemireddy

(10) Patent No.: US 9,035,745 B2
(45) Date of Patent: May 19, 2015

(54) BIOMETRIC AUTHENTICATION

(75) Inventor: Nagarjuna R. Vemireddy, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 13/363,617

(22) Filed: Feb. 1, 2012

(65) Prior Publication Data
US 2013/0194070 A1   Aug. 1, 2013

(51) Int. Cl.
G06K 9/00 (2006.01)
G05B 19/00 (2006.01)
G06F 21/36 (2013.01)

(52) U.S. Cl.
CPC ..................... *G06F 21/36* (2013.01)

(58) Field of Classification Search
None
See application file for complete search history.

(56) References Cited

U.S. PATENT DOCUMENTS

| 6,256,737 | B1 | 7/2001 | Bianco et al. | |
|---|---|---|---|---|
| 7,305,562 | B1 | 12/2007 | Bianco et al. | |
| 7,663,607 | B2 | 2/2010 | Hotelling et al. | |
| 7,804,996 | B2 | 9/2010 | Ohtomo et al. | |
| 2004/0208396 | A1 | 10/2004 | Gunther et al. | |
| 2010/0097339 | A1* | 4/2010 | Ooba | 345/173 |
| 2010/0120396 | A1* | 5/2010 | Faith et al. | 455/410 |
| 2010/0245261 | A1* | 9/2010 | Karlsson | 345/173 |
| 2011/0016390 | A1* | 1/2011 | Oh et al. | 715/702 |
| 2011/0032074 | A1* | 2/2011 | Novack et al. | 340/5.53 |
| 2011/0187497 | A1* | 8/2011 | Chin | 340/5.54 |
| 2011/0247067 | A1* | 10/2011 | Hirose | 726/19 |
| 2011/0283353 | A1 | 11/2011 | Maetz et al. | |
| 2012/0159616 | A1* | 6/2012 | Griffin et al. | 726/19 |
| 2012/0304284 | A1* | 11/2012 | Johnson et al. | 726/19 |

OTHER PUBLICATIONS

Dirik et al. "Modeling User Choice in the PassPoints Graphical Password Scheme," Proceedings of the 3rd Symposium on Usable Privacy and Security (SOUPS) 2007, Jul. 18-20, 2007, ACM, USA.
John et al. "Enhancing Security of Pass Points System Using Variable Tolerance," Int. J. of Advanced Networking and Applications, vol. 1, Issue 04, pp. 270-274, 2010.
Manabe et al. "Proposal of New Input Systems," Technology Reports, NTT DoCoMo Technical Journal, vol. 9, No. 4, pp. 37-42.
Mejia et al. "Gesture Based Touchpad Security System," Cornell University, Copyright 2010. Date printed Oct. 25, 2011 <http://people.ece.cornell.edu/land/courses/ece4760/FinalProjects/s2010/jkd27_dm472/MyPage/index.html>.

(Continued)

*Primary Examiner* — George Bugg
*Assistant Examiner* — Renee Dorsey
(74) *Attorney, Agent, or Firm* — Nicholas Cadmus

(57) ABSTRACT

A tool for determining whether to grant a current person access to a protected resource. A computer receives a plurality of touches performed by a current person on a touch screen. Each touch in the plurality of touches includes a location of the touch on the touch screen and a surface area measurement of the touch screen impacted by the current person. The computer determines whether each touch in the plurality of touches received matches a predetermined touch performed by a person authorized to access the protected resource. If each touch in the set of touches received matches a stored touch performed by a person authorized to access the protected resource the current person will be granted access to the protected resource.

12 Claims, 5 Drawing Sheets

(56) References Cited

OTHER PUBLICATIONS

Saevanee et al. "User Authentication using Combination of Behavioral Biometrics over the Touchpad acting like Touch screen of Mobile Device," ICCEE 2008. International Conference on Computer and Electrical Engineering, 2008, pp. 82-86, Dec. 20-22, 2008. doi: 10.1109/ICCEE.2008.157.

Singh et al. "Integration of Sound Signature in Graphical Password Authentication System," International Journal of Computer Applications (0975-8887), vol. 12, No. 9, pp. 11-13, Jan. 2011.

* cited by examiner

BIOMETRIC AUTHENTICATION

TECHNICAL FIELD

The present invention relates generally to security, and more specifically to a biometric enhancement for graphical touch point authentication.

BACKGROUND

Passwords are used to protect access to various types of buildings, devices and electronic resources such as computers, applications, data files, and online banking sites. Typically, a password system uses an alphanumeric string that is entered on a keyboard. Strong passwords often contain elements such as symbols, capital and lowercase letters, and numbers. These elements that make up strong passwords also make them difficult to remember.

Graphical passwords emerged as an alternative to the standard alphanumeric string password. People tend to remember images with greater accuracy than they remember text.

A common graphical authentication technique is the "passpoints" system. Generally, authentication in this system is represented by a series of click points (points clicked on an image using a computer mouse). During setup of the "passpoints" system, an image is arbitrarily chosen to help the user remember a series of click points. The user clicks on a series of click points in the image, each of the click points being a pixel in the image, and the sequence and location of each click point is stored for comparison with click points entered later by a user trying to gain access to a secured resource. If each click point entered by the user trying to gain access to the secured resource falls within a tolerance region around a corresponding stored click point, then access to the secured resource is granted. A tolerance region around each click point is needed because it is difficult to click on exactly the same pixel each time when entering click points to gain access to the secured resource. A tolerance region may be a circle of a certain radius around the click point. For example, if the click point's x and y coordinates relate to a pixel, then the error tolerance may be a circle with a radius of a certain number of pixels around the click point.

Generally, a computer mouse is used to select the click points within the "passpoints" system. However, many devices today utilize only touch screens as input devices. Touch screens allow a user to make selections or move a cursor by simply touching the touch screen via a finger or stylus. In general, the touch screen recognizes the size, shape and position of a touch on the touch screen and outputs this information to a host device. The host device may be a computer such as a desktop, laptop, handheld or tablet computer, and may be able to recognize a single touch event or multiple touch events at the same time, depending on the type of touch screen.

Touch screens typically include a touch panel and a controller. The touch panel is a clear panel with a touch sensitive surface. The touch panel is positioned in front of a display screen so that the touch sensitive surface covers the viewable area of the display screen. The touch panel registers touch events and sends these signals to the controller. The controller processes these signals into data and sends the data to the host device. Any device that houses a touch screen generally provides an Application Programming Interface (API) that programs can call to utilize the data.

The "passpoints" system described above can also be implemented using a touch screen to select a series of touch points (points touched on an image using a touch screen) instead of a series of click points.

It is known to enhance traditional character based passwords using pressure sensing keyboards to measure the amount of pressure exerted on each key while entering the password. Also, timing between each keystroke has been used to enhance these traditional character based passwords.

SUMMARY

Aspects of an embodiment of the present invention disclose a method, system, and a program product for determining whether to grant a current person access to a protected resource. The method comprises a computer receiving a plurality of locations and a plurality of measurements of a respective plurality of surface areas of a respective plurality of sequential touches by the current person on a touch screen. The computer determines whether the touch sequence of the plurality of locations approximately match a predetermined sequence of touch locations for an authorized person to access the protected resource, and whether the plurality of measurements of the respective plurality of surface areas approximately match a predetermined sequence of surface area measurements for the plurality of touches, respectively, for the authorized person to access the protected resource. If so, the computer will grant the current person access to the protected resource and if not, the computer will not granting the current person access to the protected resource.

DETAILED DESCRIPTION OF THE PREFERRED EMBODIMENTS

The present invention will now be described in detail with reference to the figures.

Figure 1:
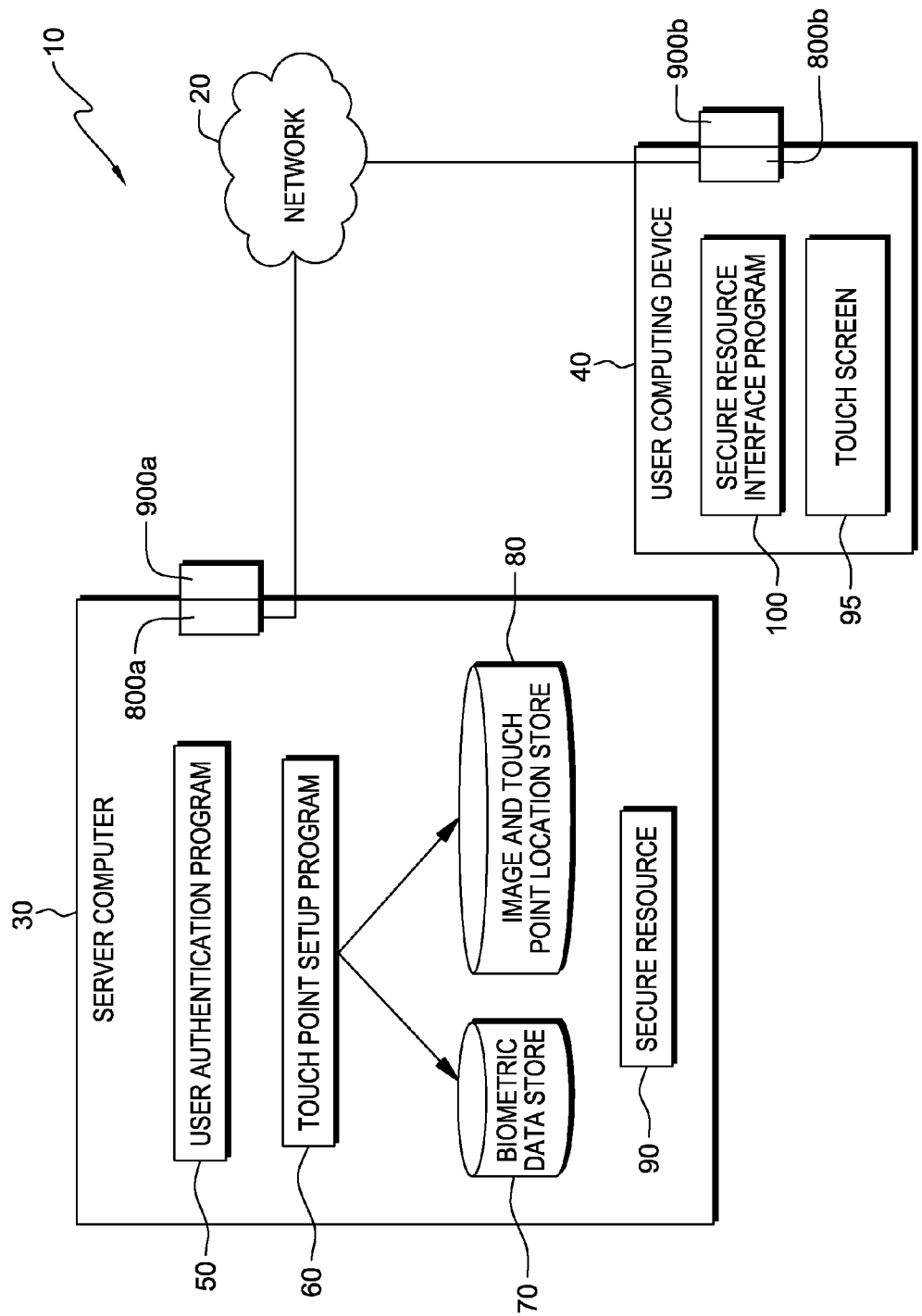
FIG. 1 depicts a diagram of a computing system including a server computer and a user computing device in accordance with one embodiment of the present invention.

FIG. 1 depicts a diagram of a computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes user computing device 40 and server computer 30 interconnected over network 20. Network 20 may be a local area network (LAN), a wide area network (WAN) such as the Internet, a combination of the two or any combination of connections and protocols that will support communications between user computing device 40 and server computer 30 in accordance with embodiments of the invention. Network 20 may include wired, wireless, or fiber optic connections.

User computing device 40 may be a laptop computer, tablet computer, desktop computer, personal digital assistant (PDA), smart phone or a touch screen device (e.g., automatic teller machine, security system controller). In general, user computing device 40 may be any electronic device or computing system capable of displaying an image on a display screen, accepting user input on touch screen 95, and communicating with server computer 30 over a network. User computing device 40 includes touch screen 95, secure resource interface program 100, internal components 800b and external components 900b.

Known touch screen 95 may be a separate component (peripheral device) attached to and in communication with user computing device 40, or it may be integrated with user computing device 40. Touch screen 95 is configured to receive input from a user's touch and to send this input to user computing device 40. User computing device 40 interprets the input in accordance with its programming.

In one embodiment, secure resource interface program 100 is a known web browser that is capable of displaying an image on user computing device 40, accepting user input from touch screen 95 on user computing device 40, and displaying web pages or images received over network 20. In other embodiments, secure resource interface program 100 may be an application on a smart phone, a security system program, or any other program that is capable of displaying an image on a display screen, accepting user input on touch screen 95, and communicating over a network with a secure resource.

Server computer 30 may be a management server, a web server, or any other electronic device capable of receiving and sending data. In other embodiments, server computer 30 may represent a server computing system utilizing multiple computers as a server system, such as in a cloud computing environment. Server computer 30 contains user authentication program 50, touch point setup program 60, biometric data store 70, image and touch point location store 80, and secure resource 90. Server computer 30 also includes internal components 800a and external components 900a.

Touch point setup program 60 stores and displays an authorized user assigned image that will be displayed on the user computing device to solicit a set of touch points during setup and subsequent authorization. During setup, touch point setup program 60 receives, from a user authorized to access secure resource 90 (an authorized user) via a user computing device such as user computing device 40, a set of touch points on the predetermined authentication image, for use by user authentication program 50 and stores the received set of touch points. Each touch point in the received set of touch points includes a touch screen input location and a biometric measurement received from a touch screen, such as touch screen 95, when the authorized user touches a touch screen plane of the touch screen.

In one embodiment, a touch screen input location is a location of a touch on the touch screen plane of the touch screen. The touch screen plane is typically mapped into a coordinate system, such as a Cartesian coordinate system, a Polar coordinate system, or some other coordinate system. When a Cartesian coordinate system is used, the touch screen input location corresponds to x and y coordinates. When a Polar coordinate system is used, the touch screen input location corresponds to radial (r) and angular coordinates ($\theta$).

Touches at touch screen input locations can be inputted sequentially, simultaneously, or a combination thereof.

In one embodiment, the controller of touch screen 95 determines the touch screen input location by calculating the centroid of a touch on the touch screen plane of touch screen 95 using raw data from the touch. The centroid of a two-dimensional shape is the intersection of all straight lines that divide that shape into two parts of equal moment. The centroid coordinates are used as the touch screen input location.

In one embodiment, user authentication program 50 uses the finger's surface area which contacts the screen at each touch point (and is sensed by touch screen 95) as an additional, biometric criteria of authentication. The controller of touch screen 95 determines the surface area measurement of a touch on touch screen 95 using raw data from the touch. The controller determines the surface area of each point touched by the finger on the screen, by adding the number of pixels touched during each touch of the finger on the touch screen and optionally, multiplying this number by the area of each pixel. In other embodiments, additional biometric measurements may include the pressure of the touch, the duration of the touch on touch screen 95, or any other biometric measurement capable of being detected by touch screen 95.

In one embodiment, touch point setup program 60 resides on server computer 30. In other embodiments, touch point setup program 60 may reside on another network server, on user computing device 40, or on any computing device, provided that touch point setup program 60 can communicate with secure resource interface program 100, biometric data store 70, and image and touch point location store 80. Touch point setup program 60 receives an initial set of touch points from a user computing device, such as user computing device 40, over network 20 and stores the initial set of touch points. In one embodiment, touch point setup program 60 stores the initial set of touch points by storing the touch screen input location of each of the initial touch points in image and touch point location store 80 and the biometric measurement of each of the initial touch points in biometric data store 70. Touch point setup program 60 also operates to allow an authorized user to modify previously stored touch points stored on server computer 30. Touch point setup program 60 receives the modified touch points from the user computing device over network 20 and stores the modified touch points. In one embodiment, touch point setup program 60 stores the modified set of touch points by storing the touch screen input location of each of the modified touch points in image and touch point location store 80 and the biometric measurement of each of the modified touch points in biometric data store 70.

In one embodiment, biometric data store 70 is a file that may be written by touch point setup program 60 and read by user authentication program 50. Biometric data store 70 operates to store an authorized user's biometric measurement for each touch point received from touch point setup program 60. In other embodiments, biometric data store 70 may be a database such as an Oracle® database or an IBM® DB2® database.

In one embodiment, biometric data store 70 resides on server computer 30. In other embodiments, biometric data store 70 may reside on another server or another computing device, provided that biometric data store 70 is accessible to user authentication program 50 and touch point setup program 60.

In one embodiment, image and touch point location store 80 is a file that may be written by touch point setup program 60 and read by user authentication program 50. Image and touch point location store 80 operates to store an authorized user's touch screen input location for each touch point received from touch point setup program 60. Image and touch point location store 80 also operates to store an authorized user's image that will be displayed to help the authorized user recall his or her predefined set of touch points. In other embodiments, image and touch point location store 80 may be a database such as an Oracle® database or an IBM® DB2® database.

In one embodiment, image and touch point location store 80 resides on server computer 30. In other embodiments, image and touch point location store 80 may reside on another server or another computing device, provided that image and touch point location store 80 is accessible to user authentication program 50 and touch point setup program 60.

Secure resource 90 may be a website, a database, a data structure, or any computer resource or device that requires user authentication to access. In one embodiment, secure resource 90 resides on server computer 30. In other embodiments, secure resource 90 may reside on another server or another computing device, provided that secure resource 90 is accessible to secure resource interface program 100.

User authentication program 50 operates to determine whether to grant a current user of computing device 40 access to secure resource 90 by determining if a set of touch points received from the current user matches a stored set of touch points of an authorized user of secure resource 90. Each touch point in the set of touch points received by user authentication program 50 includes a touch screen input location and a biometric measurement received from user computing device 40 when the current user touches touch screen 95. In one embodiment, each biometric measurement is a surface area measurement of a touch on touch screen 95. Typically the touches are input sequentially, but can also be input simultaneously using two or more fingers or instruments, or a combination thereof. In other embodiments, additional biometric measurement may be the pressure of the touch, the duration of the touch, or any other biometric measurement capable of being detected by touch screen 95.

In one embodiment, user authentication program 50 is a program residing on server computer 30. In other embodiments, user authentication program 50 may reside on another server or another computing device, provided that user authentication program 50 is accessible to secure resource interface program 100 and has access to biometric data store 70 and image and touch point location store 80.

Figure 2:
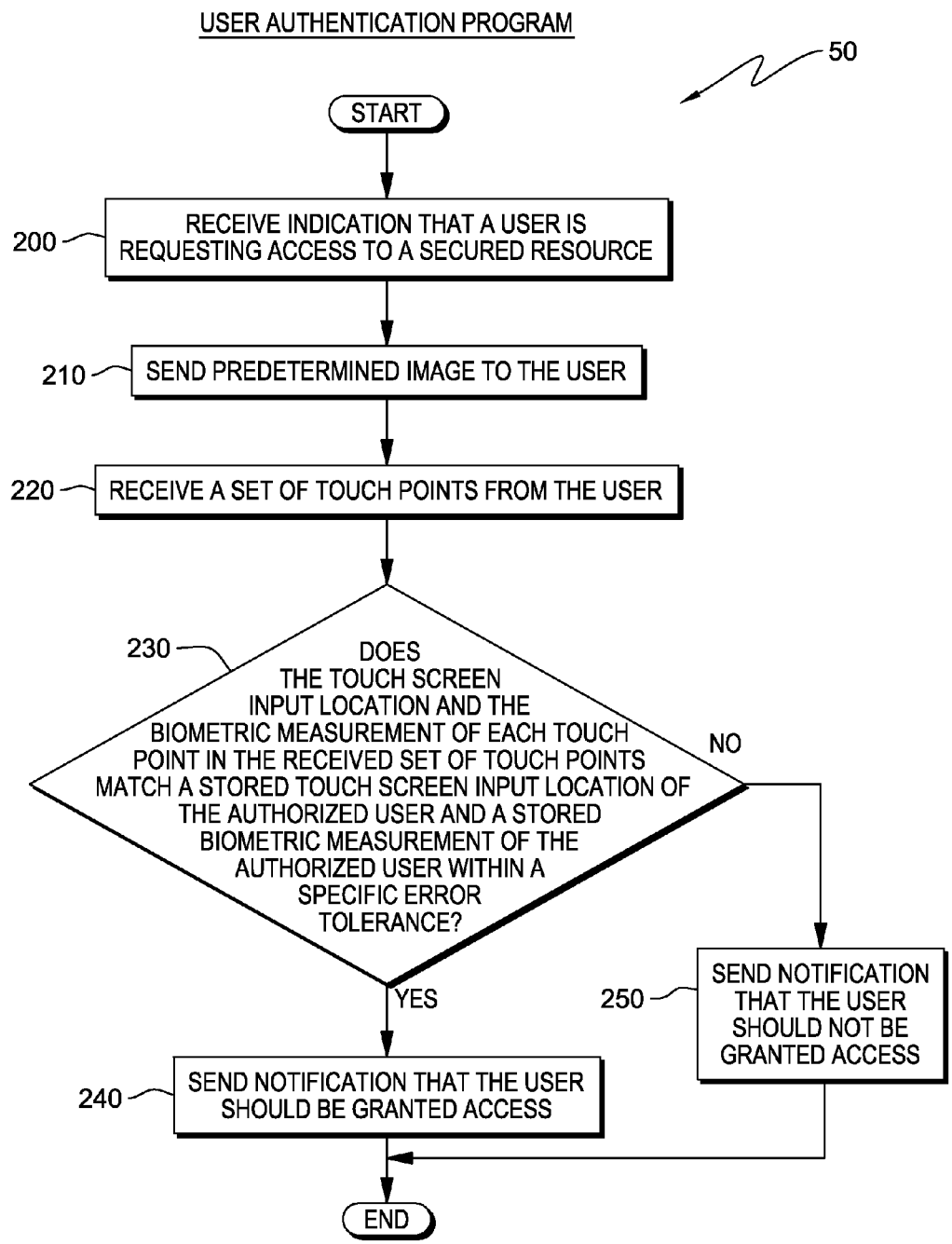
FIG. 2 depicts a flowchart of the steps of a user authentication program executing within the server computer of FIG. 1, for determining whether to grant a user operating the user computing device, access to a secure resource, in accordance with one embodiment of the present invention.

FIG. 2 depicts a flowchart of the steps of user authentication program 50 executing within the computing system of FIG. 1, for determining whether to grant a user access to a secure resource, in accordance with one embodiment of the present invention. Initially, a user at user computing device 40 requests access to secure resource 90 such as a protected application or file. Secure resource interface program 100 within user computing device 40 detects from secure resource 90 that authentication is needed to access secure resource 90 and forwards this request to user authentication program 50.

In step 200 of user authentication program 50, user authentication program 50 receives, from secure resource interface program 100 over network 20, the request to access secure resource 90 such as a an application or file.

In response to receiving the request to access the secure resource 90, user authentication program 50 sends a predetermined image, assigned by a user authorized to access secure resource 90 (an authorized user) and stored in image and touch point location store 80, to secure resource interface program 100 over network 20 (step 210). In one embodiment, user authentication program 50 queries image and touch point location store 80 to fetch the predetermined image assigned by the authorized user and sends the predetermined image to secure resource interface program 100.

In one embodiment, secure resource interface program 100 receives the predetermined image from user authentication program 50 and sends the predetermined image to a display screen operatively coupled to user computing device 40. The display screen is configured to display a graphical user interface (GUI) that may include a pointer or cursor as well as other information. The display screen may be a monochrome display, color graphics adapter (CGA) display, enhanced graphics adapter (EGA) display, variable-graphics-array (VGA) display, super VGA display, liquid crystal display (e.g., active matrix, passive matrix), cathode ray tube (CRT), or plasma display.

Secure resource interface program 100 determines a set of touch points for each touch on touch screen 95 performed by a current user of user computing device 40. Each touch point in the set of touch points includes a touch screen input location and a biometric measurement. In one embodiment, secure resource interface program 100 obtains the touch screen input location and the biometric measurement by calling an Application Programming Interface (API) of touch screen 95. Secure resource interface program 100 sends the set of touch points to user authentication program 50.

In step 220, user authentication program 50 receives the set of touch points from secure resource interface program 100 over network 20. In step 230, user authentication program 50 determines that the received set of touch points matches a stored set of touch points of the authorized user, within a specific error tolerance. User authentication program 50 determines that the touch screen input location and the biometric measurement, including the surface area of the finger which touches the screen at each touch point, for each touch point in the received set of touch points, matches a stored touch screen input location of the authorized user and a stored biometric measurement of the authorized user within a specific error tolerance. In one embodiment, user authentication program 50 queries image and touch point location store 80 and biometric data store 70 to fetch each stored touch point location of the authorized user and each stored biometric measurement of the authorized user.

User authentication program 50 determines whether the received set of touch points, including the surface area of the finger or instrument which touches the screen at each touch point, match the stored set of touch points and associated biometric information of the authorized user within the specific error tolerance (decision 230). For example, a touch point location within 2 mm of the registered touch location center is considered a sufficient match. For example, a touch surface area center within 5% of the registered touch surface area is considered a sufficient match. Alternatively, the tolerances for the touch location center and the touch surface area which are considered sufficiently close for a match can be determined by multiple samples of the persons touch locations and touch surface areas during multiple iterations of test authentication during the set up process. If so, (decision 230, yes branch), then user authentication program 50 sends a notification to secure resource interface program 100 that the current user of user computing device 40 should be granted access to secure resource 90 (step 240).

If user authentication program 50 determines that the received set of touch points including the surface area of the finger which touches each point does not match the stored set of touch points and associated biometric information of the authorized user within the specific error tolerance (decision 230, no branch), then user authentication program 50 sends a notification to secure resource interface program 100 that the current user of user computing device 40 should not be granted access to secure resource 90 (step 250).

Figure 3:
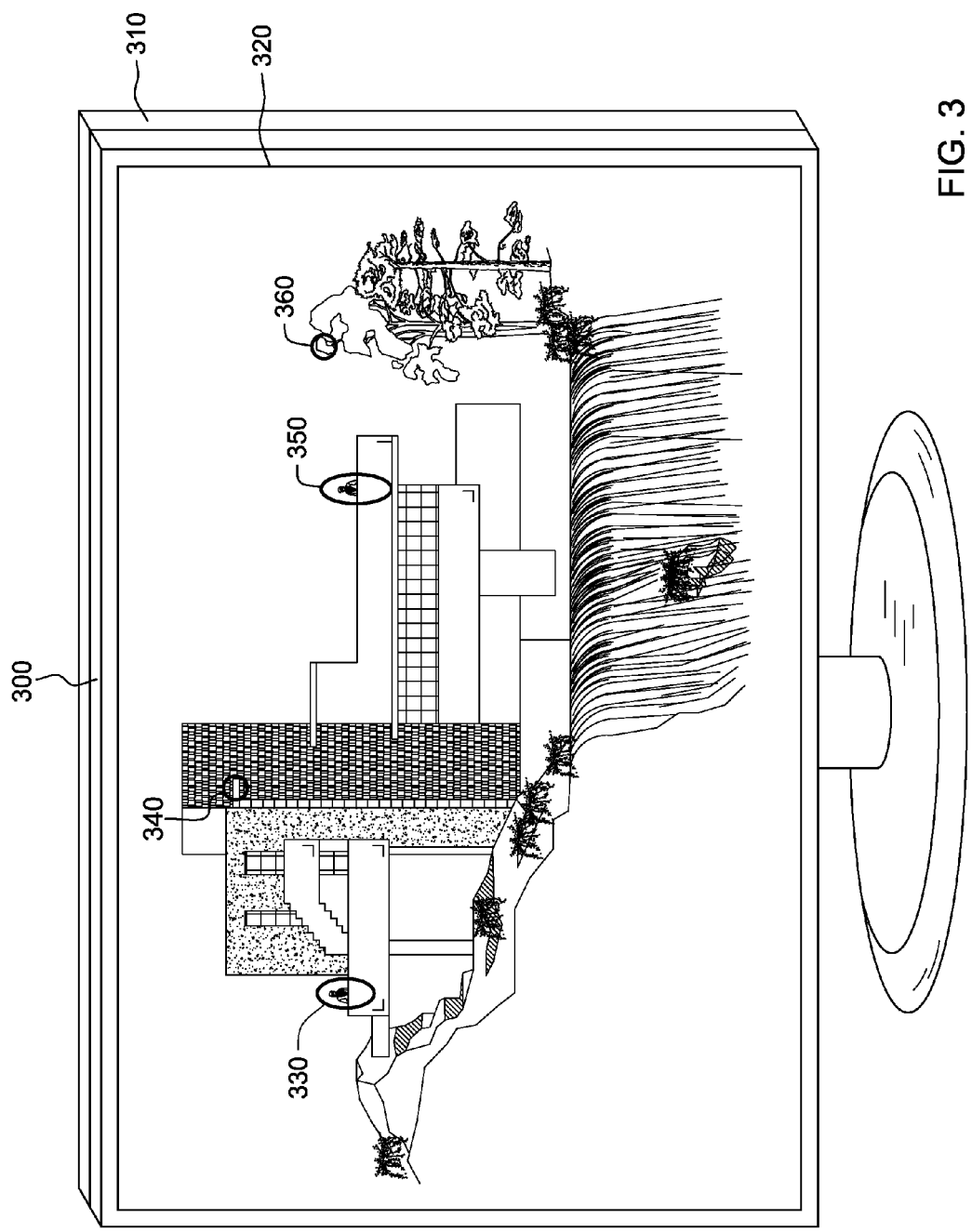
FIG. 3 is an exemplary interface to a secure resource interface program for use with the user authentication program of FIG. 2, in accordance with one embodiment of the present invention.

FIG. 3 is an exemplary interface to secure resource interface program 100 utilizing graphical authentication, in accordance with one embodiment of the present invention. Touch screen 300 lays in front of a display screen 310. Display screen 310 displays an image 320 for use with the graphical password. A user attempting to access a secure resource would touch a touch screen plane of touch screen 300 at touch points 330, 340, 350, and 360 using image 320 as a guide. The user may touch touch points 330, 340, 350, and 360 in a series (e.g., touch point 330 followed by 340 then 350 and finally 360) or the user may touch certain touch points 330, 340, 350, and 360 together (e.g., 330 and 340 together followed by 350 and 360 together) depending on how an authorized user set up the graphical password. Also, each of touch points 330, 340, 350, and 360 may have a different biometric measurement. For example, touch points 330 and 350 have a larger surface area that could be made by using the flat pad of a finger instead of the tip of the finger. Touch points 340 and 360 have a smaller surface area using the tip of a finger. The "surface area" can be in terms of the number of different pixels that are touched or this number times the area of each pixel.

Figure 4:
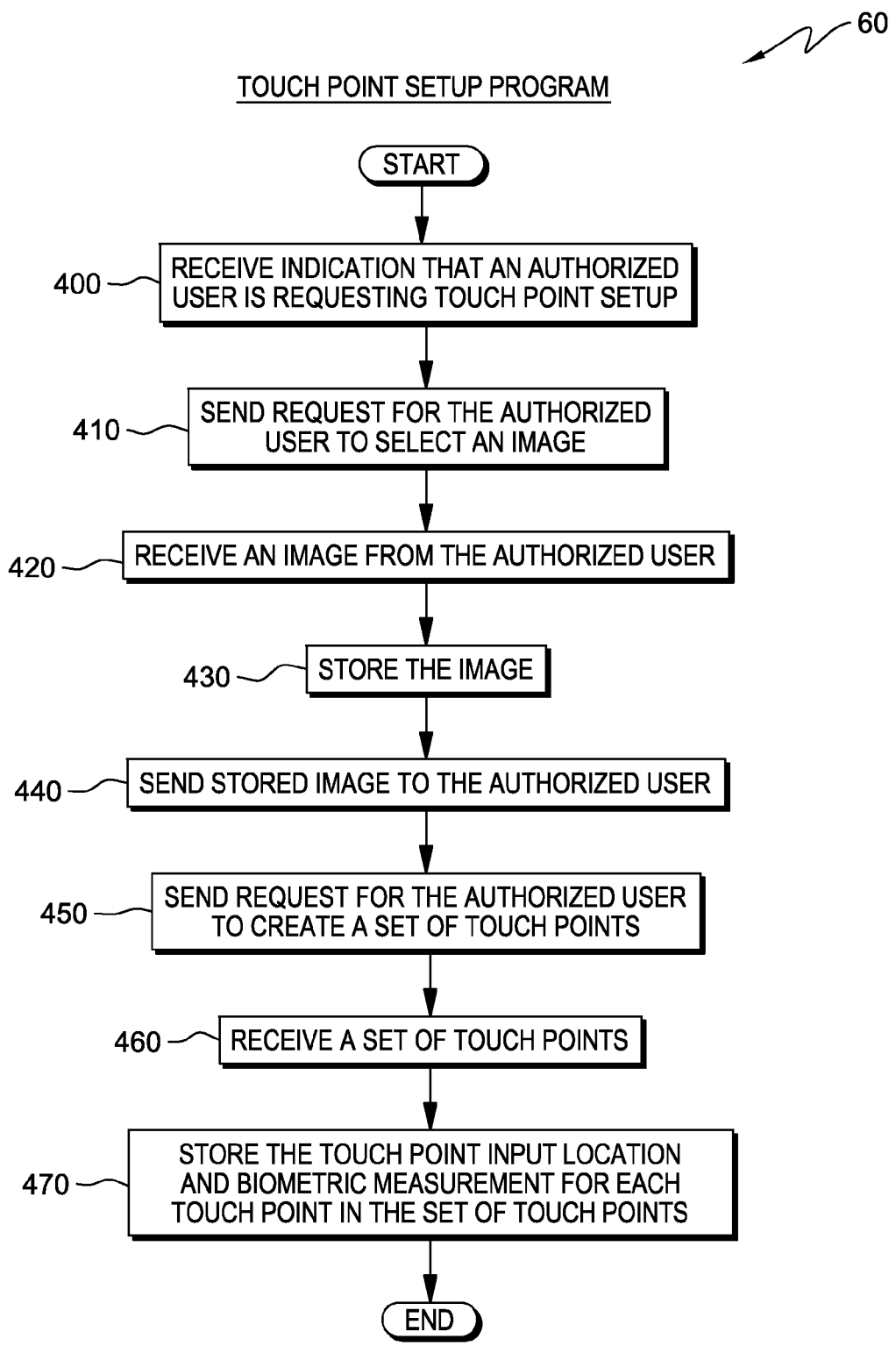
FIG. 4 depicts a flowchart of the steps of touch point setup program for defining and storing a set of touch points and an image for use with the user authentication program of FIG. 2, in accordance with one embodiment of the present invention.

FIG. 4 depicts a flowchart of the steps of touch point setup program 60 for defining and storing a set of touch points and an image, in accordance with one embodiment of the present invention.

In step 400, touch point setup program 60 receives, from secure resource interface program 100, an indication that a user authorized to access secure resource 90 (an authorized user) is requesting touch point setup. Secure resource interface program 100 sends to touch point setup program 60 the indication, in response to an authorized user selecting a touch point setup function in secure resource interface program 100 on a user computing device, such as user computing device 40.

In response to receiving the indication of the touch point setup request, touch point setup program 60 sends to secure resource interface program 100 a request for the authorized user to select and upload an image to use with user authentication program 50 (step 410).

Touch point setup program 60 receives from secure resource interface program 100 the image that the authorized user uploaded for use with user authentication program 50 (step 420).

Touch point setup program 60 stores the image that the authorized user uploaded for use with user authentication program 50 in image and touch point location store 80 (step 430) so that user authentication program 50 may access the stored image when carrying out step 210 of FIG. 2.

Touch point setup program 60 sends the uploaded image stored in image and touch point location store 80 (step 440) and a request for the authorized user to input a set of touch points (step 450) to secure resource interface program 100.

In step 460, touch point setup program 60 receives a set of touch points from secure resource interface program 100. As previously discussed, each touch point in the received set of touch points includes a touch screen input location and a biometric measurement.

For each touch point in the received set of touch points, touch point setup program 60 stores the touch point input location and the biometric measurement in image and touch point location store 80 and biometric data store 70, respectively (step 470), so that user authentication program 50 may access the stored touch point input location and stored biometric measurement when carrying out step 230 of FIG. 2.

Figure 5:
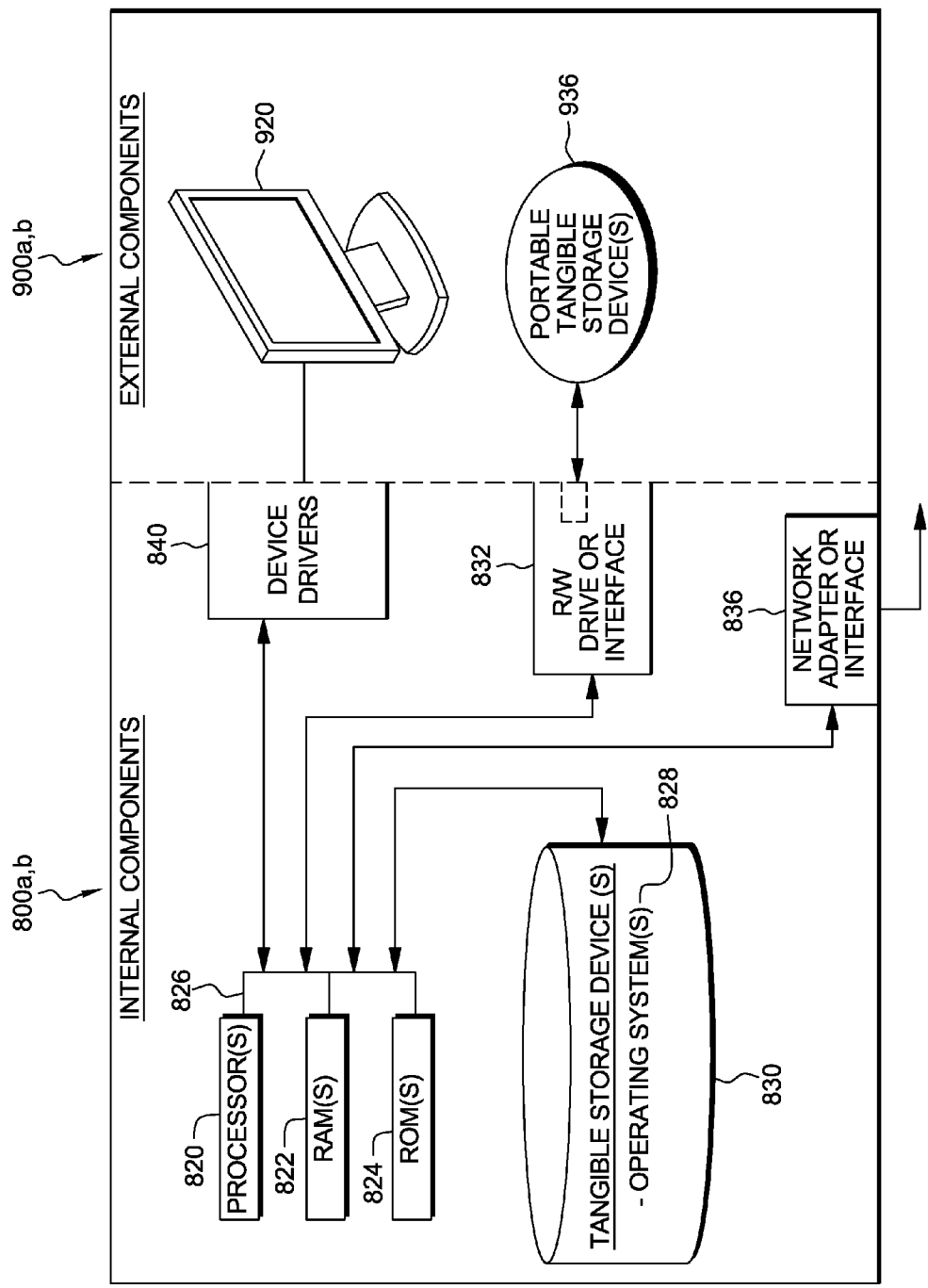
FIG. 5 is a block diagram of internal and external components of the server computer and the user computing device of FIG. 1 in accordance with one embodiment of the present invention.

FIG. 5 is a block diagram of internal and external components of server computer 30 and user computing device 40 in accordance with one embodiment of the present invention.

User computing device 40 and server computer 30 include respective sets of internal components 800*a,b* and external components 900*a,b*. Each of the sets of internal components 800*a,b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, user authentication program 50, and touch point setup program 60, are stored on one or more of computer-readable tangible storage devices 830 of internal components 800*a* for execution by one or more of processors 820 of internal components 800*a* via one or more of RAMs 822 of internal components 800*a* (which typically include cache memory). The one or more operating systems 828 and secure resource interface program 100 are stored on one or more of computer-readable tangible storage devices 830 of internal components 800*b* for execution by one or more of processors 820 of internal components 800*b* via one or more of RAMs 822 of internal components 800*b* (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. User authentication program 50 and touch point setup program 60 can be stored on one or more of portable computer-readable tangible storage devices 936 of external components 900*a*, read via R/W drive or interface 832 of internal components 800*a* and loaded into computer-readable tangible storage devices 830 of internal components 800*a*. Secure resource interface program 100 can be stored on one or more of portable computer-readable tangible storage devices 936 of external components 900*b*, read via R/W drive or interface 832 of internal components 800*b* and loaded into computer-readable tangible storage devices 830 of internal components 800*b*.

Each set of internal components 800*a,b* also includes a network adapter or interface 836 such as a TCP/IP adapter card. User authentication program 50 and touch point setup program 60 can be downloaded to server computer 30 from an external computer via a network (such as network 20) and network adapter or interface 836 of internal components 800*a*. From the network adapter or interface 836 of internal components 800*a*, user authentication program 50 and touch point setup program 60 are loaded into computer-readable tangible storage devices 830 of internal components 800*a*. Secure resource interface program 100 can be downloaded to user computing device 40 from an external computer via a network (such as network 20) and network adapter or interface 836 of internal components 800*b*. From the network adapter or interface 836 of internal components 800*b*, secure resource interface program 100 is loaded into computer-readable tangible storage devices 830 of internal components 800*b*. The network may comprise copper wires, optical fibers, wireless transmission, routers, firewalls, switches, gateway computers and/or edge servers.

Each of the sets of external components 900a,b includes a touch screen device 920. The touch screen device 920 has a touch screen that is positioned in front of a display screen. Alternatively, external components 900a may include a display monitor, a keyboard, and a computer mouse. Each of the sets of internal components 800a,b also includes device drivers 840 to interface to touch screen device 920. The device drivers 840, R/W drive or interface 832 and network adapter or interface 836 comprise hardware and software (stored in tangible storage devices 830 and/or ROM 824).

User authentication program 50, touch point setup program 60, and secure resource interface program 100 can be written in various programming languages (such as Java, C++) including low-level, high-level, object-oriented or non object-oriented languages. Alternatively, the functions of user authentication program 50, touch point setup program 60, and secure resource interface program 100 can be implemented in whole or in part by computer circuits and other hardware (not shown).

Based on the foregoing, a computer system, a method and a program product have been disclosed for determining whether to grant a user access to a secured resource. The description above has been presented for illustration purposes only. It is not intended to be an exhaustive description of the possible embodiments. One of ordinary skill in the art will understand that other combinations and embodiments are possible. Therefore, the present invention has been disclosed by way of example and not limitation.

What is claimed is:

1. A method for determining whether to grant a current person access to a protected resource, the method comprising the steps of:
   a computer receiving identifications of a plurality of locations of a respective plurality of sequential touches by the current person on a touch screen;
   the computer receiving a plurality of surface area measurements corresponding to the respective plurality of sequential touches sensed by the touch screen during the respective plurality of sequential touches;
   the computer determining whether the touch sequence of the plurality of locations approximately match a predetermined sequence of touch locations for an authorized person to access the protected resource and whether the plurality of surface area measurements corresponding to the respective plurality of sequential touches approximately match a predetermined sequence of surface area measurements for the plurality of sequential touches, respectively, for the authorized person to access the protected resource, and
   if so, the computer granting the current person access to the protected resource, and
   if not, the computer not granting the current person access to the protected resource pursuant to the plurality of sequential touches by the current person.

2. The method of claim 1, further comprising the prior steps of the computer receiving an indication that the current person is requesting access to the protected resource, and in response, the computer displaying a predetermined image on the touch screen to prompt the current person to enter a sequence of touches on the image on the touch screen.

3. The method of claim 1, further comprising the prior steps of:
   the computer receiving an indication that the authorized person is requesting setup of the predetermined sequence of touch locations and the predetermined sequence of surface area measurements;
   the computer displaying a predetermined image on the touch screen to prompt the authorized person to enter a sequence of touches on the image on the touch screen;
   the computer receiving identifications of a plurality of locations of a respective plurality of sequential touches by the authorized person on a touch screen;
   the computer receiving a plurality of measurements of a respective plurality of surface areas sensed by the touch screen during the respective plurality of sequential touches by the authorized person on a touch screen;
   the computer storing identifications of the plurality of locations of the respective plurality of sequential touches by the authorized person on a touch screen; and
   the computer storing the plurality of measurements of the respective plurality of surface areas sensed by the touch screen during the respective plurality of sequential touches by the authorized person on a touch screen.

4. The method of claim 1, wherein the step of the computer determining whether the touch sequence of the plurality of locations approximately match a predetermined sequence of touch locations for an authorized person to access the protected resource and whether the plurality of surface area measurements corresponding to the respective plurality of sequential touches approximately match a predetermined sequence of surface area measurements for the plurality of sequential touches, respectively, for the authorized person to access the protected resource comprises the computer determining whether the touch sequence of the plurality of locations match, within a predetermined error tolerance, a predetermined sequence of touch locations for an authorized person to access the protected resource and whether the plurality of surface area measurements corresponding to the respective plurality of sequential touches match, within a predetermined error tolerance, a predetermined sequence of surface area measurements for the plurality of sequential touches, respectively, for the authorized person to access the protected resource.

5. A computer program product for determining whether to grant a current user access to a secured resource, the computer program product comprising:
   one or more computer-readable tangible storage devices and program instructions stored on at least one of the one or more storage devices, the program instructions comprising:
   program instructions to receive identifications of a plurality of locations of a respective plurality of sequential touches by the current person on a touch screen;
   program instructions to receive a plurality of surface area measurements corresponding to the respective plurality of sequential touches sensed by the touch screen during the respective plurality of sequential touches;
   program instructions to determine whether the touch sequence of the plurality of locations approximately match a predetermined sequence of touch locations for an authorized person to access the protected resource and whether the plurality of surface area measurements corresponding to the respective plurality of sequential touches approximately match a predetermined sequence of surface area measurements for the plurality of sequential touches, respectively, for the authorized person to access the protected resource, and
   if so, program instructions to grant the current person access to the protected resource, and if not, program instructions to not grant the current person access to the protected resource pursuant to the plurality of sequential touches by the current person.

6. The computer program product of claim 5 further comprising program instructions, stored on at least one of the one or more storage devices, to receive an indication that the current person is requesting access to the protected resource, and in response, program instructions to display a predetermined image on the touch screen to prompt the current person to enter a sequence of touches on the image on the touch screen.

7. The computer program product of claim 5, further comprising program instructions, stored on at least one of the one or more storage devices, the program instructions comprising;
   program instructions to receive an indication that the authorized person is requesting setup of the predetermined sequence of touch locations and the predetermined sequence of surface area measurements;
   program instructions to display a predetermined image on the touch screen to prompt the authorized person to enter a sequence of touches on the image on the touch screen;
   program instructions to receive identifications of a plurality of locations of a respective plurality of sequential touches by the authorized person on a touch screen;
   program instructions to receive a plurality of measurements of a respective plurality of surface areas sensed by the touch screen during the respective plurality of sequential touches by the authorized person on a touch screen;
   program instructions to store identifications of the plurality of locations of the respective plurality of sequential touches by the authorized person on a touch screen; and
   program instructions to store the plurality of measurements of the respective plurality of surface areas sensed by the touch screen during the respective plurality of sequential touches by the authorized person on a touch screen.

8. The computer program product of claim 5, wherein the program instructions to determine whether the touch sequence of the plurality of locations approximately match a predetermined sequence of touch locations for an authorized person to access the protected resource and whether the plurality of surface area measurements corresponding to the respective plurality of sequential touches approximately match a predetermined sequence of surface area measurements for the plurality of sequential touches, respectively, for the authorized person to access the protected resource comprises program instructions to determine whether the touch sequence of the plurality of locations match, within a predetermined error tolerance, a predetermined sequence of touch locations for an authorized person to access the protected resource and whether the plurality of surface area measurements corresponding to the respective plurality of sequential touches match, within a predetermined error tolerance, a predetermined sequence of surface area measurements for the plurality of sequential touches, respectively, for the authorized person to access the protected resource.

9. A computer system for determining whether to grant a current person access to a protected resource, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
   program instructions to receive identifications of a plurality of locations of a respective plurality of sequential touches by the current person on a touch screen;
   program instructions to receive a plurality of surface area measurements corresponding to the respective plurality of sequential touches sensed by the touch screen during the respective plurality of sequential touches;
   program instructions to determine whether the touch sequence of the plurality of locations approximately match a predetermined sequence of touch locations for an authorized person to access the protected resource and whether the plurality of surface area measurements corresponding to the respective plurality of sequential touches approximately match a predetermined sequence of surface area measurements for the plurality of sequential touches, respectively, for the authorized person to access the protected resource, and
   if so, program instructions to grant the current person access to the protected resource, and
   if not, program instructions to not grant the current person access to the protected resource pursuant to the plurality of sequential touches by the current person.

10. The computer system of claim 9 further comprising program instructions, stored on at least one of the one or more storage devices for execution by at least one of the one or more processors via at least one of the one or more memories, to receive an indication that the current person is requesting access to the protected resource, and in response, program instructions to display a predetermined image on the touch screen to prompt the current person to enter a sequence of touches on the image on the touch screen.

11. The computer system of claim 9, further comprising program instructions, stored on at least one of the one or more storage devices for execution by at least one of the one or more processors via at least one of the one or more memories, the program instructions comprising;
   program instructions to receive an indication that the authorized person is requesting setup of the predetermined sequence of touch locations and the predetermined sequence of surface area measurements;
   program instructions to display a predetermined image on the touch screen to prompt the authorized person to enter a sequence of touches on the image on the touch screen;
   program instructions to receive identifications of a plurality of locations of a respective plurality of sequential touches by the authorized person on a touch screen;
   program instructions to receive a plurality of measurements of a respective plurality of surface areas sensed by the touch screen during the respective plurality of sequential touches by the authorized person on a touch screen;
   program instructions to store identifications of the plurality of locations of the respective plurality of sequential touches by the authorized person on a touch screen; and
   program instructions to store the plurality of measurements of the respective plurality of surface areas sensed by the touch screen during the respective plurality of sequential touches by the authorized person on a touch screen.

12. The computer system of claim 9, wherein the program instructions to determine whether the touch sequence of the plurality of locations approximately match a predetermined sequence of touch locations for an authorized person to access the protected resource and whether the plurality of surface area measurements corresponding to the respective plurality of sequential touches approximately match a predetermined sequence of surface area measurements for the plurality of sequential touches, respectively, for the authorized person to access the protected resource comprises program instructions to determine whether the touch sequence of the plurality of locations match, within a predetermined error tolerance, a predetermined sequence of touch locations for an authorized person to access the protected resource and whether the plurality of surface area measurements corresponding to the respective plurality of sequential touches match, within a predetermined error tolerance, a predetermined sequence of surface area measurements for the plurality of sequential touches, respectively, for the authorized person to access the protected resource.

* * * * *